United States Patent [19]

Tanaka et al.

[11] Patent Number: 4,873,109
[45] Date of Patent: Oct. 10, 1989

[54] CACAO BUTTERN SUBSTITUTE COMPOSITION

[75] Inventors: Yukitaka Tanaka; Hisao Omura; Yuuichi Irinatsu; Takashi Kobayashi; Aiko Noguchi, all of Ibaraki, Japan

[73] Assignee: Kao Corporation, Tokyo, Japan

[21] Appl. No.: 188,196

[22] Filed: Apr. 28, 1988

Related U.S. Application Data

[63] Continuation of Ser. No. 840,292, Mar. 14, 1986, abandoned.

[30] Foreign Application Priority Data

Mar. 25, 1985 [JP] Japan ................................. 60-60267

[51] Int. Cl.$^4$ ........................... A23D 5/00; A23G 1/00
[52] U.S. Cl. ..................................... 426/607; 426/601
[58] Field of Search .............................. 426/607, 601

[56] References Cited

U.S. PATENT DOCUMENTS

| 3,492,130 | 1/1970 | Harwood | 426/607 |
| 4,199,611 | 4/1980 | Toyoshima et al. | 426/607 |
| 4,268,527 | 5/1981 | Matsuo et al. | 426/607 X |
| 4,275,081 | 6/1981 | Coleman et al. | 426/33 |
| 4,276,322 | 6/1981 | Padley et al. | 426/607 X |
| 4,283,436 | 8/1981 | Soeters et al. | 426/607 |
| 4,588,604 | 5/1986 | Baker et al. | 426/607 X |

FOREIGN PATENT DOCUMENTS

| 0093602 | 11/1983 | European Pat. Off. |
| 2340979 | 9/1982 | France. |
| 7809374 | 9/1978 | Netherlands. |
| 2119397 | 11/1983 | United Kingdom. |

Primary Examiner—Donald E. Czaja
Assistant Examiner—Celine T. Callahan
Attorney, Agent, or Firm—Flynn, Thiel, Boutell & Tanis

[57] ABSTRACT

A cacao butter substitute composition comprising (a) at least 80 wt. % of 1,3-disaturated-2-oleoyl glycerols comprising (a-1) up to 10 wt. %, based on the weight of (a), of 1,3-dipalmitoyl-2-oleoyl glycerol, (a-2) 25 to 45 wt. %, based on the weight of (a), of 1-palmitoyl-2-oleoyl-3-stearoyl glycerol and (a-3) 45 to 70 wt. %, based on the weight of (a), of 1,3-distearoyl-2-oleoyl glycerol, said composition containing less than 20 wt. % of other triglycerides.

9 Claims, No Drawings

CACAO BUTTERN SUBSTITUTE COMPOSITION

This application is a continuation of U.S. Ser. No. 840,292, filed Mar. 14, 1986, now abandoned.

SUMMARY OF THE INVENTION

The invention relates to a cacao butter substitute composition. It is called also as a substitute composition for cacao butter in the specification.

GENERAL DESCRIPTION

Hard butters, a typical example of which is cacao butter, have wide applications in the production of confectionary and pastry mainly comprising chocolate as well as in the formulation of pharmaceuticals. In these fields, it is required that a hard butter has a very narrow plastic region. That is, it should maintain a sufficient hardness at room temperature or below, but rapidly melt around the body temperature. Cacao butter begins to soften at approximately 30 to 32° C. and completely melts at approximately 36° C. These melting properties are brought about by the glyceride composition of the fats. The cacao butter, in general, comprises 70 wt. % or larger of three 1,3-disaturated-2-oleoyl glycerols, which are 1,3-dipalmitoyl-2-oleoyl glycerol (POP), 1-palmitoyl-2-oleoyl-3-stearoyl glycerol (POSt) and 1,3-distearoyl-2-oleoyl glycerol (StOSt). The three glycerols show a similar melting behavior to each other, which brings about melting properties of the cacao butter in which a very narrow plastic region is exhibited.

However the cacao butter having the particular composition and properties as mentioned above can be obtained from cacao beans grown in a limited region. Further the special properties makes it an internationally speculative product which is very precariously supplied at an unsettled cost. Furthermore the composition and properties of cacao butter vary depending on the district of its growth. Thus it has been desired for a long period of time to develop a substitute composition for cacao butter which can partly or completely replace cacao butter and maintain or even improve sufficient hard butter properties.

Prior Art

Various substitutes for cacao butter have been developed from natural fats and oils containing a large amount of 1,3-disaturated-2-oleylglycerols similar to cacao butter. For example, a substitute for cacao butter may be prepared by appropriately blending, e.g. illipe fat, shea fat, mowrah fat, sal fat, palm oil and mango kernel oil as such or in the form of fractions having an abundance of 1,3-disaturated-2-oleoylglycerols obtained by solvent fractionation or similar procedures.

However, cacao butter and the substitutes therefor have some disadvantages from a practical viewpoint in spite of their excellent properties. Among these disadvantages, poor thermal stability is most serious. That is to say, conventional chocolate products do not always satisfy every desirable property, i.e. shape retention, snapping, texture and blooming resistance in summer. Further, in the case of a chocolate product containing a fat of a completely different composition, e.g. milk fat, the latter fat would significantly lower the properties of cacao butter, which makes the preparation of the product per se difficult. That is, decreases in working, molding and release properties caused by an increase in the viscosity and insufficient tempering tend to result in fat blooming in this case unless tempering is carried out under strictly controlled conditions. In addition, the chocolate product thus obtained can not maintain various desirable properties under wider conditions of storage, even if it is produced under such restricted conditions.

There have been developed substitutes for cacao butter partly suitable for ameliorating disadvantages of cacao butter. An example of these substitutes is a composition obtained by blending shea fat stearin fraction having an abundance of 1,3-distearoyl-2-oleoyl glycerol with a palm mid-fraction. These cacao butter substitutes can be replaced for cacao butter, however, only in a very small extent. In the practical production of chocolate products, the cacao butter substitute can be employed in an amount of at most 30% by weight of cacao butter. Further it is required to strictly control temperature in tempering these chocolate products. Furthermore a chocolate product wherein some portion of cacao butter is replaced by a substitute for cacao butter mainly comprising shea fat stearin fraction to give a satisfactory thermal stability frequently shows fat-blooming and a crumbling texture even when it is carefully tempered. This is because homogeneous and fine fat crystals are hardly or insufficiently formed during the tempering step which results in the growth and/or migration of the fat crystals in the chocolate tissue upon storage. Description of the Invention It is an object of the present invention to provide a substitute composition for cacao butter which can replace cacao butter in a wide range and significantly improves the thermal stability of the same. More particularly, it is an object of the present invention to provide a substitute composition for cacao butter available in producing chocolate products which satisfy all requisites including satisfactory shape retention, snapping, texture and blooming resistance when stored in summer under the same or similar tempering condition to those employed for cacao butter.

It is another object of the present invention to provide a substitute composition for cacao butter which can replace cacao butter in the production of a chocolate product containing fat(s) which may damage the thermal stability of cacao butter, e.g. milk fat, in a wide composition range to thereby significantly improve the thermal stability of the product. That is, it is an object of the present invention to provide a substitute composition for cacao butter available in producing a milk chocolate product which contains 15% by weight based on fats or more milk fat and shows an excellent thermal stability without significantly altering the tempering condition.

In order to achieve these objects, we have examined various compositions mainly comprising 1,3-disaturated-2-oleoylglycerol in detail and consequently found that a substitute composition for cacao butter which comprises three 1,3-disaturated-2-oleoylglycerols, i.e. 1,3-dipalmitoyl-2-oleoylglycerol, 1-palmitoyl-2-oleoyl-3-stearoylglycerol, and 1,3-distearoyl-2-oleoylglycerol in a definite ratio and impurities in an amount less than a definite level can exhibit very excellent properties when blended with cacao butter in a wide composition range, thus completing the present invention.

DESCRIPTION OF THE PREFERRED EMBODIMENT

A cacao butter substitute composition of the invention comprises:

(a) 80 percent by weight or larger of 1,3-disaturated-2-oleoyl glycerols comprising:

(a-1) 10 percent by weight or smaller of 1,3-dipalmitoyl-2-oleoyl glycerol, (a-2) 25 to 45 percent by weight of 1-palmitoyl-2-oleoyl-3-stearoyl glycerol and (a-3) 45 to 70 percent by weight of 1,3-distearoyl-2-oleoyl glycerol and (b) 20 percent by weight or smaller of the below mentioned glycerides (b-1) to (b-5):

(b-1) 10 percent by weight or smaller of one or more triglycerides having two unsaturations in a molecule, (b-2) 6 percent by weight or smaller of one or more diglycerides, (b-3) 5 percent by weight or smaller of one or more 1,2-disaturated-3-oleoyl glycerols, (b-4) 5 percent by weight or smaller of one or more trisaturated glycerides and (b-5) 5 percent by weight or smaller of one or more triglycerides having three or more unsaturations in a molecule.

It is preferable in the practical point of view that the composition comprises less than 20 percent by weight of (b) said glycerides. It is also preferable that (b) said glycerides comprises less than 10 wt. % of (b-1), less than 6 wt. % of (b-2), less than 5 wt. % of (b-3), less than 5 wt. % of (b-4) and less than 5 wt. % of (b-5).

The composition of the invention is defined also to comprise the components (a) and (b):

(a) at least 80% by weight based on the substitute composition for cacao butter of 1,3-disaturated-2-oleoylglycerols comprising 10% by weight or less of 1,3-dipalmitoyl-2-oleoylglycerol, 25 to 45% by weight of 1-palmitoyl-2-oleoyl-3-stearoylglycerol and 45 to 70% by weight of 1,3-distearoyl-2-oleoylglycerol; and (b) the following glycerides in a total amount of less than 20% by weight of the substitute composition for cacao butter;

(i) not more than 10% by weight of a triglyceride having two unsaturated bonds per molecule;

(ii) not more than 6% by weight of a diglyceride;

(iii) not more than 5% by weight of a 1,2-disaturated-3-oleoylglycerol;

(iv) not more than 5% by weight of a trisaturated glyceride; and (v) not more than 5% by weight of a triglyceride having three or more unsaturated bonds per molecule.

The composition of the present invention substantially comprises three 1,3-disaturated-2-oleoylglycerols i.e. POP, POSt and StOSt optionally with other glycerides in a total amount of less than 20% by weight based on the composition.

The composition of the present invention comprising the abovementioned three triglycerides may be chemically synthesized. Alternately it may be prepared by blending these glycerides isolated from natural fats by, for example, crystallization with each other in a desired ratio. In particular, it may be readily prepared by a 1,3-position selective ester exchange reaction which is disclosed in Japanese patent application No. 110334/1984 by us. That is, it may be obtained through an ester interchange reaction wherein the content of fatty acids at positions 1 and 3 containing free palmitic and stearic acids is controlled to a desired level with the use of an enzyme catalyst such as a lipase originated from *Rhizopus delemar* which selectively acts on the positions 1 and 3 of a glyceride.

The composition of glycerides may be readily analyzed by high-performance liquid chromatography with an appropriately standardized normal phase column of argentation silica and a reverse phase column treated with octadecylsilane (cf. K. Atizetmuller, Prog. Lipid Res., 21, 179–181 and 183–186 (1982)).

The substitute composition for cacao butter of the present invention, which mainly comprises POP, POSt and StOSt in a limited ratio with glycerides other than these 1,3-disaturated-2-oleoylglycerols in a controlled amount, can replace cacao butter in a wider range than conventional substitute compositions for cacao butter and impart a significantly improved thermal resistance to the cacao butter. Further it can significantly inhibit the deterioration of crystallization and melting properties when blended with milk fat having a completely different composition from that of cacao butter.

Glycerides other than POP, POSt and StOSt, such as diglycerides, trisaturated glycerides (SSS) and 1,2-disaturated-3-oleoylglycerols (SSO) should be employed in an amount of less than 20% by weight based on the composition. In particular, a composition which contains more than 10% by weight of triglycerides having two unsaturated bonds per molecule such as 1-palmitoyl-2,3-dioleoylglycerol (POO), 1-stearoyl-2,3-dioleoylglycerol (StOO) or 1,3-disaturated-2-linoleoylglycerol (SLS) can not improve the thermal resistance and workability however carefully the ratio of POP, POSt and StOSt is controlled. In this case, the thermal stability significantly decreases with an increase in the content of cacao butter. In addition, the formation of stable crystals at tempering is delayed thereby.

Thus a useful composition comprises less than 20% by weight, based on the total composition, of glycerides other than 1,3-disaturated-2-oleoylglycerols and at least 90% by weight, based on the total amount of POP, POSt and StOSt, of POSt and StOSt. That is to say, a composition comprising more than 10% by weight, based on the total amount of these three 1,3-disaturated-2-oleoylglycerols, of POP can not impart a sufficient thermal stability to cacao butter. On the other hand, a composition comprising more than 70% by weight of StOSt significantly affects the tempering condition accompanied by a lowered texture even though the POP content therein is controlled to less than 10% by weight so that it can replace cacao butter only in a very limited range. That is, a composition comprising more than 70% by weight, based on the total amount of POP, POSt and StOSt of StOSt, shows a lowered compatibility with cacao butter and crystallizing and melting properties significantly different from those of cacao butter.

As described above, it is possible to impart to the cacao butter substitute a satisfactory thermal stability by restricting the total amount of glycerides other than 1,3-disaturated-2-oleoylglycerols to less than 20% by weight and controlling the POP and StOSt contents to levels not exceeding 10% by weight and 45 to 70% by weight, respectively. It is further possible to maintain a wide substitute range for cacao butter by controlling the POSt content among the three 1,3-disaturated-2-oleoylglycerols at a level of 25 to 45% by weight.

The ratio of stearic acid to palmitic acid in the free fatty acids of the substitute composition of the present invention is essentially in a range of 2.0 to 6.0 depending on the specification of the glyceride composition of the same as defined above. A substitute composition for cacao butter having said ratio smaller than 2 might not impart a satisfactory thermal stability, while the one having a larger ratio might exhibit a poor compatibility with cacao butter and undesirable texture and melting profiles.

The cacao butter substitute composition according to the present invention comprising the ingredients (a) and (b) as defined above is useful in the production of chocolate products. In particular, it may be blended with a relatively large amount, i.e., 5 to 40% by weight of milk fat in the production of milk chocolate products. A fat composition comprising 60 to 95% by weight of the substitute composition for cacao butter of the present invention and 5 to 40% by weight of milk fat is suitable for the production of chocolate products since it can substitute for cacao butter in a wide composition range to thereby provide chocolate products of an excellent thermal stability without affecting the tempering condition.

EXAMPLES

To further illustrate the present invention, the following Example will be given wherein all percentages and parts are by weight.

Preparation and composition of substitute compositions for cacao butter

An enzyme catalyst selectively acting only on positions 1 and 3 of glycerides was prepared according to the method of Japanese patent application No. 110334/1984 proposed by us. 1000 parts of a soft fraction of palm oil, 100 parts of Celite, 10 parts of ion-exchanged water and two parts of a commercially available lipase (*Rhizopus delemar* lipase; mfd. by Seikagaku Kogyo Co., Ltd.) were mixed by stirring in a sealed container at 40° C. for 12 hours. After the completion of the reaction, the insoluble matter comprising a mixture of the Celite and the lipase was collected by filtration and washed with 100 parts of n-hexane thrice to thereby completely remove the fat. Then it was dried in vacuo at 20 to 30° C. for one hour, thus giving an enzyme catalyst.

78 parts of the enzyme catalyst thus obtained, 300 parts of a palm oil fraction having a medium melting point and an iodine value of 34, 450 parts of stearic acid having a purity of 98% and 1800 parts of n-hexane were mixed by stirring in a sealed container at 40° C. for three days to thereby carry out an ester interchange reaction. Then the enzyme catalyst was filtered off from the obtained crude reaction product, which was further subjected to solvent fractionation to give a mid-fraction corresponding to a cacao butter substitute composition (Sample 1). Similar compositions were obtained by appropriately blending compositions which were prepared by controlling the ratio of stearic acid to palmitic acid in free fatty acids (Sample 2 and Comparative Samples 1 and 2). Furthermore a shea fat stearin fraction which is a known cacao butter substitute having a thermal stability was employed for comparison (Comparative Sample 3). Table 1 shows the glyceride composition of each sample.

TABLE 1

| | | Sample 1 | Sample 2 | C. Sample 1 | C. Sample 2 | C. Sample 3 | Cacao butter |
|---|---|---|---|---|---|---|---|
| SOS | | 86.5 | 88.9 | 85.9 | 88.2 | 78.1 | 82.1 |
| in SOS | POP | 8.0 | 4.8 | 12.7 | 2.9 | 4.4 | 18.6 |
| | POSt | 40.5 | 33.9 | 43.9 | 15.6 | 14.3 | 46.4 |
| | StOSt | 50.1 | 62.0 | 43.4 | 80.1 | 78.1 | 34.4 |
| POO + StOO + SLS | | 5.6 | 4.5 | 6.0 | 4.7 | 14.2 | 12.6 |
| Diglycerides | | 3.0 | 2.7 | 3.8 | 2.4 | 4.9 | 2.5 |
| SSO | | 0.9 | 0.6 | 1.1 | 0.9 | 0.5 | 0.1 |
| SSS | | 3.4 | 2.6 | 2.5 | 2.9 | 2.1 | 1.9 |
| Other triglycerides* | | 0.6 | 0.7 | 0.7 | 0.7 | 0.2 | 0.8 |

*Other glycerides include triglycerides having three or more unsaturated bonde per molecule such as trioleoyIglycerol (OOO), 1-palmitoyl-2-linoleoyl-3-oleoylglycerol (PLO) and 1-stearoyl-2-oleoyl-3-linoleoylglycerol (StOL).

Thermal stabilities of substitute compositions for cacao butter:

Table 2 shows a comparison of thermal stabilities of the samples as shown in Table 1 and cacao butter depending on the fat content. In Table 2, S represents a fat composition which is practically useful as a substitute composition for cacao butter wherein 50% of cacao butter is replaced, while M represents a fat composition corresponding to a milk chocolate product wherein 15% by weight of milk fat is blended. Each fat composition was aged in a programmed thermostatic both for 20 cycles each comprising a period at 20° C. for 12 hours and another at 30° C. for 12 hours. Then the fat content of the same was determined at each temperature.

TABLE 2

| | Comparison of thermal stabilities depending on fat content | | | | | | | | |
|---|---|---|---|---|---|---|---|---|---|
| | Cacao butter | | Sample 1 | | Sample 2 | | C. Sample 1 | | C. Sample 3 |
| | S' | M | S | M | S | M | S | M | S | M |
| 25° C. | 72.5 | 50.9 | 80.4 | 61.2 | 84.1 | 65.0 | 74.6 | 51.5 | 69.6 | 54.0 |
| 30° C. | 49.8 | 24.7 | 66.9 | 41.8 | 76.9 | 51.9 | 56.1 | 26.3 | 57.7 | 39.2 |
| 32.5° C. | 21.2 | 7.4 | 47.4 | 22.7 | 57.0 | 33.2 | 27.8 | 14.1 | 41.7 | 22.3 |
| 36° C. | 2.8 | 0.9 | 4.8 | 1.5 | 10.8 | 4.1 | 3.1 | 2.2 | 8.1 | 2.3 |

Note:
S': Cacao butter alone.
S: A fat composition comprising 50% by weight of each sample and 50% by weight of cacao fat.
M: Obtained by blending 15% by weight of milk fat with the fat composition S.

Sample 1 significantly improves the thermal stability of cacao butter. Sample 2 is particularly effective in improving the thermal stability when milk fat is contained in a high ratio. Comparative Sample 1 containing a large amount of POP does not significantly improve the thermal stability. Thus it is possible to impart an excellent thermal stability by appropriately blending the composition of the present invention depending on the substitute ratio for cacao butter.

Compatibilities of substitute compositions for cacao butter with cacao butter

Table 3 shows compatibilities of samples as shown in Table 1 with cacao butter. Each composition was allowed to melt and tempered at 26° C. for 15 hours. Then the fat content was determined to thereby compare the amount of the formed crystals.

TABLE 3

Comparison of compatibilities with cacao butter depending on fat content

| Cacao butter: Sample (by weight) | Sample 1 | Sample 2 | C. Sample 2 | C. Sample 3 |
|---|---|---|---|---|
| 100:0 | 46.3 | 46.3 | 46.3 | 46.3 |
| 70:30 | 59.5 | 66.1 | 42.5 | 25.0 |
| 50:50 | 56.4 | 64.0 | 33.0 | 24.2 |
| 30:70 | 57.4 | 65.1 | 40.6 | 23.6 |
| 0:100 | 55.2 | 67.2 | 65.2 | 46.0 |

Samples 1 and 2, which are the compounds of the present invention, each shows the formation of crystals in a larger amount than that of cacao butter during the tempering step when blended with cacao butter in any ratio. On the other hand, Comparative Sample 2 containing a significantly large amount of StOSt in 1,3-disaturated-2-oleoylglycerols and Comparative Example 3 show each an obvious decrease in the amount of the formed crystals when tempered under the condition as defined above.

Thus, these Comparative Samples show crystallizing behaviors largely different from that of cacao butter.

As described above, the substitute composition for cacao butter according to the present invention, which comprises a sufficient amount of POSt and StOSt in 1,3-disaturated-2-oleoylglycerols and glycerides other than 1,3-disaturated-2-oleoylglycerols in an amount controlled not to exceed a definite level, can substitute cacao butter in a wide composition range, thus giving a significantly improved thermal stability when tempered under similar conditions to that employed for cacao butter.

Practical evaluation of milk chocolate products

Qualities of milk chocolate products produced by replacing cacao butter by Sample 2 and Comparative Sample 3 where evaluated. As shown in Table 4, the substitute ratio of each composition for cacao butter was varied.

TABLE 4

Milk chocolate composition

| Ingredient (% by weight) | (parts by weight) | | |
|---|---|---|---|
| | Comp. 1 | Comp. 2 | Comp. 3 |
| sugar | 45 | 45 | 45 |
| cacao mass | 10 | 10 | 10 |
| cacao butter | 7 | 12 | 17 |
| substitute for cacao butter | 18 | 13 | 8 |
| whole-fat powdery milk (containing 25% of milk fat) | 20 | 20 | 20 |
| lecithin | 0.4 | 0.4 | 0.4 |
| vanillin | 0.02 | 0.02 | 0.02 |
| (fat composition) | | | |
| cacao butter | 35.2 | 49.3 | 63.4 |
| substitute for cacao butter | 50.7 | 36.6 | 22.5 |
| milk fat | 14.1 | 14.1 | 14.1 |

Each composition was ground and conched at 55° C. for 48 hours in a conventional manner. The chocolate liquor thus conched was cooled under stirring, tempered at 30 ±1° C., poured into a mold and cooled in a cooling tunnel at 10° C. The milk chocolate product thus obtained was aged at 20° C. for two weeks and stored at 26 to 32° C. Qualities of the same including snapping, texture and blooming resistance were evaluated. Table 5 shows the result.

TABLE 5

Practical evaluation of milk chocolate products

| | Composition | Workability | | Evaluation of chocolate product | | |
|---|---|---|---|---|---|---|
| | | at tempering | Mold-release property | Snapping | Texture | Blooming resistance |
| Sample 2 | Comp. 1 | O | O | ⊚ | O | ⊚ |
| | Comp. 2 | ⊚ | ⊚ | ⊚ | ⊚ | ⊚ |
| | Comp. 3 | ⊚ | ⊚ | O | ⊚ | O |
| C. Sample 3 | Comp. 1 | XX | XX | XX | XX | XX |
| | Comp. 2 | Δ | Δ | Δ | Δ | X |
| | Comp. 3 | O | O | O | O | Δ |

⊚ very good
O good
Δ not good
X poor
XX very poor

The above result obviously indicates that Sample 2, which is the composition of the present invention, can replace cacao butter in a wide composition range to readily provide a chocolate product of excellent properties. On the other hand, in the case of Comparative Sample 3 which is a stearin fraction, the production of a chocolate product becomes difficult accompanied by deteriorated properties with an increase in the substitute ratio for cacao butter.

Effects of the Invention

The substitute composition for cacao butter of the present invention comprising the ingredients (a) and (b) can be replaced for cacao butter in a wide composition range to thereby impart a significantly excellent thermal stability to the same. Further it can replace cacao butter in a wide composition range in the production of a chocolate products which contains a fat (e.g. milk fat) capable of lowering the thermal stability of cacao butter to thereby significantly improve the thermal stability and give a satisfactory melting profile. Therefore it is highly useful as a material for chocolate products.

The embodiments of the invention in which an exclusive property or privilege is claimed are defined as follows:

1. A cacao butter substitute composition which consists essentially of:
    (a) at least 80 percent by weight, based on the total weight of the composition, of 1,3-disaturated-2-oleoyl glycerols having a member selected from the group consisting of palmitoyl groups, stearoyl groups and palmitoyl and stearoyl groups contained at the 1 and 3 positions of said glycerols, said 1,3-disaturated-2-oleoyl glycerols consisting of:
        (a-1) up to 10 percent by weight of 1,3-dipalmitoyl-2oleoyl glycerol, based on the total weight of (a),
        (a-2) 25 to 45 percent by weigh of 1-palmitoyl-2-oleoyl-3-stearoyl glycerol, based on the total weight of (a), and
        (a-3) 45 to 70 percent by weight of 1,3-distearoyl-2-oleoyl glycerol, based on the weight of (a), and
    (b) up to 20 percent by weight, based on the total weight of the composition, of glycerides comprising:
        (b-1) up to 10 percent by weight of triglycerides having two unsaturations in the molecule,
        (b-2) up to 6 percent by weight of diglycerides,
        (b-3) up to 5 percent by weight of 1,2-disaturated-3-oleoyl glycerols,
        (b-4) up to 5 percent by weight of trisaturated glycerides and
        (b-5) up to 5 percent by weight of triglycerides having three or more unsaturations in the molecule.

2. A composition as claimed in claim 1, in which (a) consists of at least 90 wt. % of (a-2) and (a-3).

3. A composition as claimed in claim 1, in which the weight ratio of stearoyl groups to palmitoyl groups in (a) is from (2.0/1.0) to (6.0/1.0).

4. A composition as claimed in claim 3 in which component (a) contains at least 4.8 percent by weight of 1,3-dipalmitoyl-2-oleoyl glycerol, based on the total weight of (a).

5. A composition as claimed in claim 3 which has been prepared by effecting an ester interchange reaction between a glyceride oil and palmitic acid or stearic acid, in the presence of *Rhizopus delemar* lipase as a catalyst which selectively acts on the 1 and 3 positions of the glyceride oil.

6. A composition as claimed in claim 3 in which component (a) consists of from 4.8 to 8.0 percent by weight of (a-1), from 33.9 to 40.5 percent by weight of (a-2) and from 50.1 to 62 percent by weight of (a-3).

7. A composition as claimed in claim 1, in which (a) is present in an amount of 86.5 percent by weight and comprises 8.0 percent by weight of (a-1), 40.5 percent by weight of (a-2) and 50.1 percent by weight of (a-3).

8. A composition as claimed in claim 1, which (a) is present in an amount of 88.9 percent by weight and comprises 4.8 percent by weight of (a-1), 33.9 percent by weight of (a-2) and 62.0 percent by weight of (a-3).

9. A cacao butter substitute composition which consists essentially of:
    (a) at least 80 percent by weight, based on the total weight of the composition, of 1,3-disaturated-2-oleoyl glycerols consisting of:
        (a-1) from 4.8 to 8.0 percent by weight of 1,3-dipalmitoyl-2-oleoyl glycerol, based on the total weight of (a),
        (a-2) 33.9 to 40.5 percent by weight of 1-palmitoyl-2-oleoyl-3-stearoyl glycerol, based on the total weight of (a), and
        (a-3) 50.1 to 62.0 percent by weight of 1,3-distearoyl-2-oleoyl glycerol, based on the weight of (a) the weight ratio of stearoyl groups to palmitoyl groups being in the range of (2.0/1.0) to (6.0/1.0), and
    (b) up to 20 percent by weight, based on the total weight of the composition, of glycerides comprising:
        (b-1) up to 10 percent by weight of triglycerides having two unsaturations in the molecule,
        (b-2) up to 6 percent by weight of diglycerides,
        (b-3) up to 5 percent by weight of 1,2-disaturated-3-oleoyl glycerols,
        (b-4) up to 5 percent by weight of trisaturated glycerides and
        (b-5) up to 5 percent by weight of triglycerides having three or more unsaturations in the molecule, said composition having been prepared by effecting an ester interchange reaction between a glyceride oil and palmitic acid or stearic acid, in the presence of *Rhizopus delemar* lipase as a catalyst which selectively acts on the 1 and 3 positions of the glyceride oil.

* * * * *